United States Patent [19]

Kitakami et al.

[11] Patent Number: 4,828,919
[45] Date of Patent: May 9, 1989

[54] MAGNETIC RECORDING MEDIUM AND PROCESS FOR PREPARING THE SAME

[75] Inventors: Osamu Kitakami, Toride; Hideo Fujiwara; Tsuyoshi Maro, both of Ibaraki, all of Japan

[73] Assignee: Hitachi, Maxwell, Ltd., Osaka, Japan

[21] Appl. No.: 79,527

[22] Filed: Jul. 30, 1987

[30] Foreign Application Priority Data

Aug. 1, 1986 [JP] Japan ................... 61-181648

[51] Int. Cl.⁴ .............................................. G11B 5/64
[52] U.S. Cl. ...................................... 428/336; 427/38; 427/41; 427/44; 427/48; 428/694; 428/900
[58] Field of Search ............... 428/694, 900, 336; 427/41, 44, 48, 51, 131

[56] References Cited

U.S. PATENT DOCUMENTS

| 4,210,946 | 7/1980 | Iwasaki et al. | 428/900 |
| 4,277,809 | 7/1981 | Fisher et al. | 428/900 |
| 4,410,603 | 10/1985 | Yamamori et al. | 428/611 |
| 4,622,273 | 11/1986 | Nakashima et al. | 427/131 |
| 4,624,894 | 11/1986 | Kishimoto et al. | 428/694 |
| 4,643,941 | 2/1987 | Miyoshi et al. | 428/694 |
| 4,675,224 | 6/1987 | Hosokawa | 428/900 |

Primary Examiner—Paul J. Thibodeau
Attorney, Agent, or Firm—Antonelli, Terry & Wands

[57] ABSTRACT

A magnetic recording medium comprising a non-magnetic substrate, a soft magnetic layer formed thereon, and a perpendicularly magnetizable layer formed on the soft magnetic layer, where at least the soft magnetic layer is a vapor deposited mixture layer composed of an organic material and a ferromagnetic material, has distinguished flexibility and durability.

25 Claims, 1 Drawing Sheet

EVACUATION

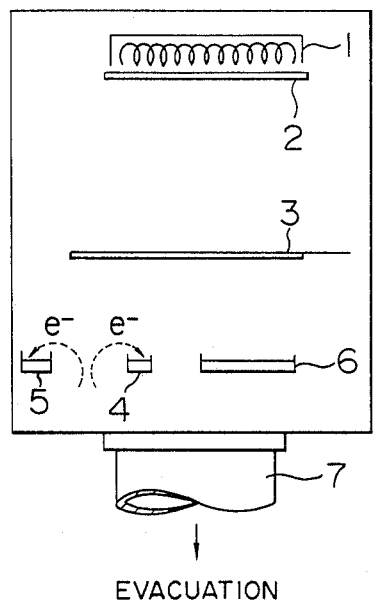
EVACUATION

MAGNETIC RECORDING MEDIUM AND PROCESS FOR PREPARING THE SAME

BACKGROUND OF THE INVENTION

This invention relates to a magnetic recording medium and a process for preparing the magnetic recording medium, and more particularly to a magnetic recording medium having an imporved magnetic layer and a process for preparing the same.

The conventional magnetic recording system is based mainly on magnetizing a recording medium in an intraplanar direction, and has a problem of demagnetization due to more intensification of a demagnetizing field on the recording magnetization with increasing recording density. To overcome this problem, a perpendicular magnetic recording system has been proposed, where a recording medium is magnetized in a direction perpendicular to the film surface to eliminate demagnetization in the region of high recording density.

The perpendicular magnetic recording medium can be classified into two groups: a monolayer film medium whose magnetic layer is a perpendicularly magnetizable single layer, and a double layer film medium composed of a soft magnetic layer and a perpendicularly magnetizable layer provided thereon.

The soft magnetic layer of the double layer film medium serves to focue the magnetic field of a magnetic head on a recording region and stabilize the recording magnetization. Consequently the reproduction output power of the double layer film medium is much increased, as compared with that of the monolayer film medium (U.S. Pat. No. 4,210,946).

Intensive research and development of double layer film media for perpendicular recording has been so far made from such viewpoints. According to a specific structure, a soft magnetic thin film of permalloy, Co-based amorphous material, etc. is provided on a substrate, and a perpendicularly magnetizable film of Co-Cr alloy is provided on the soft magnetic thin film. However, a magnetic recording medium having such a metallic thin film as a layer has such problems that it is less flexible and is more liable to be scarred with sliding of a magnetic head.

Furthermore, a magnetic recording medium having such a structure that a dispersion of soft magnetic powder in a binder is coated onto a non-magnetic substrate and a perpendicular magnetizable layer is provided on the soft magnetic powder layer has been proposed, but has such problems that a higher packing density and uniform dispersion of the soft magnetic powder cannot be obtained, resulting in increased number of dropouts in the region of high recording density. Furthermore, it is difficult to obtain a uniform thickness of the soft magnetic powder layer as coated, and thus the surface properties of the perpendicularly magnetizable layer to be formed thereon are deteriorated, resulting in larger spacing loss. That is, it has been so far impossible in the prior art processes to prepare a magnetic recording medium of the double layer film type for perpendicular recording having a uniform quality on a mass-production scale.

SUMMARY OF THE INVENTION

An object of the present invention is to overcome the drawbacks in the mechanical characteristics of a double layer film medium for perpendicular recording so far proposed and to provide a magnetic recording medium of double layer film type for perpendicular recording having distinguished flexibility and durability, and a process for preparing the same.

The object of the present invention can be attained by a magnetic recording medium comprising a non-magnetic substrate, a soft magnetic layer provided thereon and a perpendicularly magnetizable layer provided thereon, wherein at least the soft magnetic layer is composed of a vapor-deposited mixture layer of an organic material and a ferromagnetic material.

As a result of extensive studies of a magnetic recording medium of the double layer film type for perpendicular recording, the present inventors have found that the flexibility and durability of a magnetic recording medium of the double layer film type for perpendicular recording can be drastically increased by forming a soft magnetic layer as a vapor deposited mixture layer of an organic material and a ferromagnetic material, and have established the present invention on the basis of this finding.

the thickness itself of a soft magnetic layer is not essential for the present invention. Too thin a soft magnetic layer cannot attain the object of the present invention, whereas too thick a layer has a lower flexibility. Thus, it is preferable that the soft magnetic layer has a thickness ranging from 0.01 $\mu$m to 1.0 $\mu$m as a general guide for selection.

A ferromagnetic material for the soft magnetic layer as an underlayer for the perpendicularly magnetizable layer is preferably at least one material having distinguished soft magnetic characteristics such as Mn-Zn ferrite, permalloy, etc.

An organic material for making the soft magnetic layer together with the ferromagnetic material is preferably at least one polymer such as polyethylene, polyethylene terephthalate, polypropylene, polystyrene, polytetrafluoroethylene, polybutadiene, polyvinyl chloride, polyurethane, etc., monomers as components of the foregoing polymers, and low molecular weight polymers derived from the foregoing monomers (for example, oligomers). Compounds other than the foregoing can also be used.

The ferromagnetic material and the organic material are mixed in an appropriate mixing ratio and are used to form a soft magnetic layer as an underlayer for the perpendicularly magnetizable layer. A preferable content of the ferromagnetic material in the soft magnetic layer as the underlayer is in a range of 40 to 95% by volume. If the content of the ferromagnetic material is below 40% by volume, the number of dropouts is increased at a high density recording and the S/N ratio is decreased. On the other hand, when the content of the ferromagnetic material is above 95% by volume, the flexibility is considerably deteriorated, and also the susceptibility to scarring due to the sliding of a magnetic head is increased.

The soft magnetic layer as the underlayer can be formed by depositing the organic material and the ferromagnetic material onto a non-magnetic substrate at the same time according to a vapor deposition process or by accumulating the ferromagnetic material onto a nonmagnetic substrate according to a vapor deposition process, while injecting the monomer gas of the organic material onto the substrate, and by exposing the deposited layer surface to an excitation beam such as an electron beam, an ionizing beam, an electromagnetic beam, etc. during or after the vapor deposition.

The "vapor deposition process" herein used means a process for depositing a material, a compound, etc., which is to be deposited in a gaseous atmosphere or in a vacuum space, as its vapor or ionized vapor onto a substrate, and includes, for example, a vacuum vapor deposition process, an ion plating process, a high frequency ion plating process, an ion cluster beam process, an ion beam deposition process, a sputtering process, a CVD process, etc.

In order to enhance the adhesion of vapor deposited organic material to the substrate and also enhance the mechanical durability of the soft magnetic layer, it is preferable during the deposition of the organic material according to the vapor deposition process to expose a stream of organic material vapor to a plasma beam, or expose the deposited organic material layer to an electron beam, an ionizing beam such as $\alpha$-ray, $\beta$-ray, etc., an electromagnetic beam such as a microwave, ultraviolet ray, X-ray, $\gamma$-ray, etc., or a proton beam or a neutron beam, thereby accelerating the polymerization of organic material.

The organic material can be introduced in a gaseous form into a vacuum chamber from the outside or disposed in a liquid or solid form in a vapor deposition reactor and vaporized, decomposed or sublimated by an ordinary means such as resistance heating, heated sputter, etc.

The present magnetic recording medium has a perpendicularly magnetizable layer on the soft magnetic layer as the underlayer. The vertically magnetizable layer is also the so called complex film composed of ferromagnetic metal particles and an organic material.

The ferromagnetic material for the perpendicularly magnetizable layer is preferably $\gamma$-hematite, magnetoplumbite-type ferrite including barium ferrite, and various alloys with Co, Fe, Ni or 3d transition metals.

On the organic material for use in the vertically magnetizable layer, any of polymers, oligomers and monomers can be used. Specifically, any of organic polymers such as polyethylene, polyethylene terephthalate, polypropylene, polystyrene, polytetrafluoroethylene, polybutadiene, polycarbonate, polyamide, polyimide, polyvinyl cholride, polyvinyl acetate, polyurethane, etc., monomers as compounds for these organic polymers, and low molecular weight polymers derived from the monomers (oligomers) can be used. Needless to say, other compounds than the above can be used.

The ferromagnetic material and the organic material are mixed in an appropriate mixing ratio to form a perpendicularly magnetizable layer. The content of the ferromagnetic material in the perpendicularly magnetizable layer is preferably in a range of 40 to 95% by volume. If the content of the ferromagnetic material is below 40% by weight, the number of dropouts is increased in the high density recording and also the S/N ratio is also lowered. On the other hand, when the content of the ferromagnetic material exceeds 95% by volume, the flexibility is considerably deteriorated, and also susceptibility to scarring due to the sliding or a magnetic head is increased.

The perpendicularly magnetizable layer can be formed by depositing the organic material and the ferromagnetic material onto a non-magnetic substrate at the same time according to a vapor deposition process or by accumulating the ferromagnetic material onto a non-magnetic substrate according to a vapor deposition process, while injecting the monomer gas of the organic material onto the substrate, and exposing the deposited layer surface to an excitation beam such as an electron beam, an ionizing beam, an electromagnetic beam, etc. during or after the vapor deposition, in the same manner as in the case of forming the soft magnetic layer as the underlayer.

In depositing the organic material to form the perpendicularly magnetizable layer, the organic material can be treated in the same manner as the organic material for forming the soft magnetic layer as the underlayer is treated.

The non-magnetic substrate for use in the present magnetic recording medium includes, for example, polymer films such as those of polyimide, polyethylene terephthalate, etc., sheets of glass, ceramics, metal sheets of aluminum, anodically oxidized aluminium, brass, etc., Si monocrystal sheet, Si monocrystal sheet whose surface is thermally oxidized, etc.

In the present magnetic recording medium of the double layer film type for perpendicular recording, the soft magnetic layer as an underlayer for the perpendicularly magnetizable layer is a vapor-deposited mixture layer of an organic material and a ferromagnetic material, formed according to the vapor deposition process. In the soft magnetic layer, the ferromagnetic particles are uniformly distributed in the organic material, and thus the soft magnetic layer has a uniform thickness. Furthermore, a good adhesion of the soft magnetic layer to the non-magnetic substrate and the perpendicularly magnetizable layer can be obtained owing to the nature of vapor deposited layer, and particularly a satisfactory adhesion to any perpendicularly magnetizable layer can be obtained.

Due to the uniform thickness and the good adhesion of the soft magnetic layer, the present magnetic recording medium of the double layer film type for perpendicular recording has distinguished flexibility and durability and also has distinguished high density recording characteristics.

The deposition process can more readily produce a magnetic recording medium of uniform quality at a low cost on a mass production scale than the coating process.

BRIEF DESCRIPTION OF THE DRAWING

The single FIGURE is a schematic view of a vacuum vapor deposition apparatus for use in the preparation of the present magnetic recording medium.

PREFERRED EMBODIMENT OF THE INVENTION

The present invention will be described in detail below, referring to one embodiment of the present invention by way of the accompanying drawing.

EXAMPLE 1

Magnetic recording media of the double layer film type for perpendicular recording, each of which had a soft magnetic layer of a composite film composed of an organic material and a ferromagnetic material as an underlayer for a perpendicularly magnetizable layer, were formed in a vacuum vapor deposition apparatus shown in the single FIGURE.

At first, the vacuum chamber provided with a shutter 3 was evacuated to a pressure of $3 \times 10^{-6}$ Torr or less through an evacuation vent pipe 7, and a polyethylene terephthalate (PET) film substrate 2 having a thickness of 75 $\mu$m was heated to 80° C. by a heater 1. In this state, permalloy and PET were evaporated from evaporation sources 4 and 6, respectively, to form a soft magnetic layer having a thickness of 0.5 μm as the underlayer on the substrate.

Successively, $Co_{90}Cr_{10}$ alloy and PET were evaporated from evaporation sources 5 and 6, respectively, to form a perpendicularly magnetizable layer having a thickness of 0.3 μm on the soft magnetic layer. Throughout the soft magnetic layer and the perpendicularly magnetizable layer, the content by volume of the ferromagnetic materials as contained in both layers was made equal.

Then, disks, 5.25 inch in diameter, were punched out of the thus prepared vapor-deposited films, and the thus obtained magnetic recording medium disks for perpendicular recording were investigated in a magnetic disk-driving apparatus to make the following evaluations.

Recording and reproduction of the disks were carried out with a ferrite ring head, 0.3 μm in gap length, at a recording density of 60 kfci to count the number of dropouts. Making the number of dropouts in the case of no inclusion of the organic material in both soft magnetic layer and the perpendicularly magnetizable layer the reference number, the number of dropouts, which was not more than 1.5 times the reference number, was evaluated as "satisfactory" and that over 1.5 times the reference number was evaluated as "unsatisfactory".

The contact state between a magnetic head and the magnetic recording disks was investigated by making a magnetic head of transparent glass, pressing the magnetic head onto the surface of the disk and observing the resulting interference fringes to determine the contact area. A floppy of the coating type now in use was used as a standard sample, and its contact area was made a reference area. The contact area which fell within 0.7 of the reference area was evaluated as "satisfactory" and that which was more than 0.7 of the reference area was evaluated as "unsatisfactory".

The durability of the magnetic recording disks was evaluated by the number of passes until the disks were scarred while pressing a Mn-Zn ferrite polished to a radius of curvature of 30 R onto the disk surfaces under a load of 19 g.

The evaluation results are summarized in the following Table 1.

TABLE 1

| Content of ferromagnetic material (vol %) | Number of dropouts | Contact state with a magnetic head | Durability (K passes) |
|---|---|---|---|
| 30 | Unsatisfactory | Satisfactory | 1000< |
| 40 | Satisfactory | Satisfactory | 1000< |
| 60 | Satisfactory | Satisfactory | 1000< |
| 95 | Satisfactory | Satisfactory | 1000< |
| 100 | Satisfactory | Unsatisfactory | <500 |

As is evident from the foregoing results, magnetic recording media having a soft magnetic layer composed of 40 to 95% by volume of a magnetic material and 60 to 5% by volume of an organic material as an underlayer and a perpendicularly magnetizable layer have less occurrence of dropouts, a good contact state with a magnetic head and a good durability.

EXAMPLE 2

A magnetic recording medium of the double layer film type for perpendicular recording having a soft magnetic layer of a composite film composed of 5% by volume of PET as an organic material and 95% by volume of permalloy as a ferromagnetic material as an underlayer for a perpendicularly magnetizable layer was formed in a vacuum vapor deposition apparatus in the same manner as in Example 1.

Successively, $Co_{90}Cr_{10}$ alloy R was evaporated from evaporation source 5 to form a perpendicularly magnetizable layer having a thickness of 0.3 μm on the soft magnetic layer.

Then, a disk, 5.25 inch in diameter, was punched out of the thus prepared vapor-deposited film, and the thus obtained magnetic recording medium disk for perpendicular recording was investigated in a magnetic disk-driving apparatus in the same manner as in Example 1.

It was found that number of dropouts and contact state with a magnetic head were satisfactory and durability was more than 1,000 K passes.

COMPARATIVE EXAMPLE

A dispersion of permalloy powder having an average particle size of 0.3 μm in a binder was coated onto a polyethylene terephthalate substrate having a thickness of 75 μm to a layer thickness of 1 μm. Furthermore, $Co_{90}Cr_{10}$ alloy and PET were vapor deposited onto the resulting layer at the same time, whereby a perpendicularly magnetizable layer having a thickness of 0.3 μm was formed thereon. Throughout the soft magnetic layer as the underlayer and the perpendicularly magnetizable layer, the content by volume of the ferromagnetic material as contained in both layers was made equal, but the content of the ferromagnetic material in the soft magnetic layer could not be made more than 55% by volume.

The thus prepared magnetic recording media were evaluated in the same manner as in Example 1, and the results are summarized in the following Table 2.

TABLE 2

| Content of ferromagnetic material (vol %) | Number of dropouts | Contact state with a magnetic head | Durability (K passes) |
|---|---|---|---|
| 30 | Unsatisfactory | Satisfactory | <500 |
| 40 | Unsatisfactory | Unsatisfactory | <500 |
| 55 | Unsatisfactory | Unsatisfactory | <500 |

As is evident from the foregoing results, the media prepared according to the coating process were inferior in the number of dropouts, contact state with a magnetic head and durability to the present media prepared according to the vapor deposition process. Particularly, it was impossible to make the content of the ferromagnetic material more than 55% by volume in the soft magnetic layer according to the coating process, and this is a technical limit to the practice of the coating process.

It is evident from the foregoing facts that the present magnetic recording medium having a soft magnetic layer of vapor deposited mixture is surprisingly distinguished over the conventional magnetic recording medium of the coating type.

What is claimed is:

1. A magnetic recording medium which comrises a non-magnetic substrate, a soft magnetic layer formed thereon, and a perpendicularly magnetizable layer formed on the soft magnetic layer, at least the soft magnetic layer being a vapor deposited mixture layer composed of an organic material and a ferromagnetic material, wherein a content of the ferromagnetic material in the soft magnetic layer is in a range of 40 to 95% by volume.

2. A magnetic recording medium according to claim 1, wherein the soft magnetic layer has a thickness of 0.01 to 1.0 $\mu$m.

3. A magnetic recording medium according to claim 1, wherein the soft magnetic layer contains at least one of Mn-Zn ferrite and permalloy as the ferromagnetic material.

4. A magnetic recording medium according to claim 1, wherein the soft magnetic layer contains at least one of polyethylene, polyethylene terephthalate, polypropylene, polystyrene, polytetrafluoroethylene, polybutadiene, polyvinyl chloride, and polyurethane as the organic material.

5. A magnetic recording medium according to claim 1, wherein the perpendicularly magnetizable layer comprises barium ferrite or Co-Cr alloy.

6. A process for preparing a magnetic recording medium composed of a non-magnetic substrate, a soft magnetic layer of composite film composed of an organic material and a ferromagnetic material formed thereon, and a perpendicularly magnetizable layer formed on the soft magnetic layer, which comprises depositing the organic material and the ferromagnetic material onto the substrate at the same time according to a vapor deposition process, thereby forming the soft magnetic layer, wherein a content of the ferromagnetic material in the soft magnetic layer is in a range of 40 to 95% by volume.

7. A process for preparing a magnetic recording medium composed of a non-magnetic substrate, a soft magnetic layer of composite film composed of an organic material and a ferromagnetic material formed thereon and a perpendicularly magnetizable layer formed on the soft magnetic layer, which comprises accumulating the ferromagnetic material onto the non-magnetic substrate according to a vapor deposition process while injecting a monomer gas of the organic material onto the substrate, and exposing the vapor deposited layer surface to an excitation beam during or after the accumulation, thereby forming the soft magnetic layer, wherein a content of the ferromagnetic material in the soft magnetic layer is in a range of 40 to 95% by volume.

8. A magnetic recording medium according to claim 1, wherein said perpendicularly magnetizable layer is a vapor deposited mixture layer composed of ferromagnetic metal particles and an organic material.

9. A magnetic recording medium according to claim 8, wherein a content of the ferromagnetic metal particles in the perpendicularly magnetizable layer is in a range of 40 to 95% by volume.

10. A process for preparing a magnetic recording medium according to claim 6, wherein the soft magnetic layer has a thickness of 0.01 to 1.0 $\mu$m.

11. A process for preparing a magnetic recording medium according to claim 6, wherein the soft magnetic layer contains at least one of Mn-Zn ferrite and permalloy as the ferromagnetic material.

12. A process for preparing a magnetic recording medium according to claim 6, wherein the soft magnetic layer contains at least one of polyethylene, polyethylene terephthalate, polypropylene, polystyrene, polytetrafluoroethylene, polybutadiene, polyvinyl chloride, and polyurethane as the organic material.

13. A process for preparing a magnetic recording medium according to claim 6, wherein the perpendicularly magnetizable layer comprises barium ferrite or Co-Cr alloy.

14. A process for preparing a magnetic recording medium according to claim 6, wherein said organic material is exposed to a plasma beam during deposition.

15. A process for preparing a magnetic recording medium according to claim 6, wherein said soft magnetic layer is exposed to an electron beam, an ionizing beam, an electromagnetic beam, a proton beam or a neutron beam after deposition.

16. A process for preparing a magnetic recording medium according to claim 6, wherein said perpendicularly magnetizable layer is a vapor deposited mixture layer composed of ferromagnetic metal particles and an organic material.

17. A process for preparing a magnetic recording medium according to claim 7, wherein a content of the ferromagnetic metal particles in the perpendicularly magnetizable layer is in a range of 40 to 95% by volume.

18. A process for preparing a magnetic recording medium according to claim 7, wherein the soft magnetic layer has a thickness of 0.01 to 1.0 $\mu$m.

19. A process for preparing a magnetic recording medium according to claim 7, wherein the soft magnetic layer contains at least one of Mn-Zn ferrite and permalloy as the ferromagnetic material.

20. A process for preparing a magnetic recording medium according to claim 7, wherein the soft magnetic layer contains at least one of polyethylene, polyethylene terephthalate, polypropylene, polystyrene, polytetrafluoroethylene, polybutadiene, polyvinly chloride, and polyurethane as the organic material.

21. A process for preparing a magnetic recording medium according to claim 7, wherein the perpendicularly magnetizable layer comprises barium ferrite or Co-Cr alloy.

22. A process for preparing a magnetic recording medium according to claim 7, wherein said organic material is exposed to a plasma beam during deposition.

23. A process for preparing a magnetic recording medium according to claim 7, wherein said soft magnetic layer is exposed to an electron beam, an ionizing beam, an electromagnetic beam, a proton beam or a neutron beam after deposition.

24. A process for preparing a magnetic recording medium according to claim 7, wherein said perpendicularly magnetizable layer is a vapor deposited mixture layer composed of ferromagnetic metal particles and an organic material.

25. A process for preparing a magnetic recording medium according to claim 7, wherein a content of the ferromagnetic metal particles in the perpendicularly magnetizable layer is in a range of 40 to 95% by volume.

* * * * *